United States Patent
Corba

(10) Patent No.: US 7,152,588 B2
(45) Date of Patent: Dec. 26, 2006

(54) INTERCOOLER BYPASS

(75) Inventor: David Corba, Des Plaines, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 518 days.

(21) Appl. No.: 10/271,236

(22) Filed: Oct. 15, 2002

(65) Prior Publication Data

US 2004/0069284 A1   Apr. 15, 2004

(51) Int. Cl.
*F02B 33/00* (2006.01)
*F02B 29/04* (2006.01)

(52) U.S. Cl. .................................. 123/563; 60/599
(58) Field of Classification Search ................ 123/563; 60/599

See application file for complete search history.

(56) References Cited

U.S. PATENT DOCUMENTS

| | | | |
|---|---|---|---|
| 4,385,496 A * | 5/1983 | Yamane | 60/599 |
| 4,449,371 A * | 5/1984 | Sone et al. | 60/611 |
| 4,513,571 A * | 4/1985 | Jenny et al. | 60/603 |
| 4,513,729 A | 4/1985 | Udd | 123/563 |
| 4,660,532 A | 4/1987 | Tholen | |
| 4,716,734 A * | 1/1988 | Nakao et al. | 60/599 |
| 4,987,741 A | 1/1991 | Moser | |
| 5,385,019 A * | 1/1995 | Kulig et al. | 60/599 |
| 5,546,975 A | 8/1996 | Pernet | |
| 5,649,516 A * | 7/1997 | Laveran | 123/563 |
| 5,669,363 A | 9/1997 | Francis | |
| 6,336,447 B1 | 1/2002 | Bartel et al. | 123/563 |

FOREIGN PATENT DOCUMENTS

| | | | | |
|---|---|---|---|---|
| DE | 3627686 A1 * | 11/1987 | | 60/599 |
| JP | 57195820 A * | 12/1982 | | 60/599 |
| JP | 62048923 A * | 3/1987 | | 123/563 |
| JP | 03117649 A * | 5/1991 | | 123/563 |

* cited by examiner

*Primary Examiner*—Thai-Ba Trieu
(74) *Attorney, Agent, or Firm*—Susan L. Lukasik; Dennis K. Sullivan; Jeffrey P. Calfa

(57) ABSTRACT

A method of bypassing an intercooler (105) for an engine (100) includes the step of detecting (703) an idle condition for an engine (100). based on engine speed and load, air is induced (707) to bypass an intercooler (105) for the engine (100) such that air is input to an intake manifold (107) of the engine (100) through an intercooler bypass (115) that excludes the intercooler (105). Improved engine performance on vehicle launch and reduced emissions result.

25 Claims, 3 Drawing Sheets

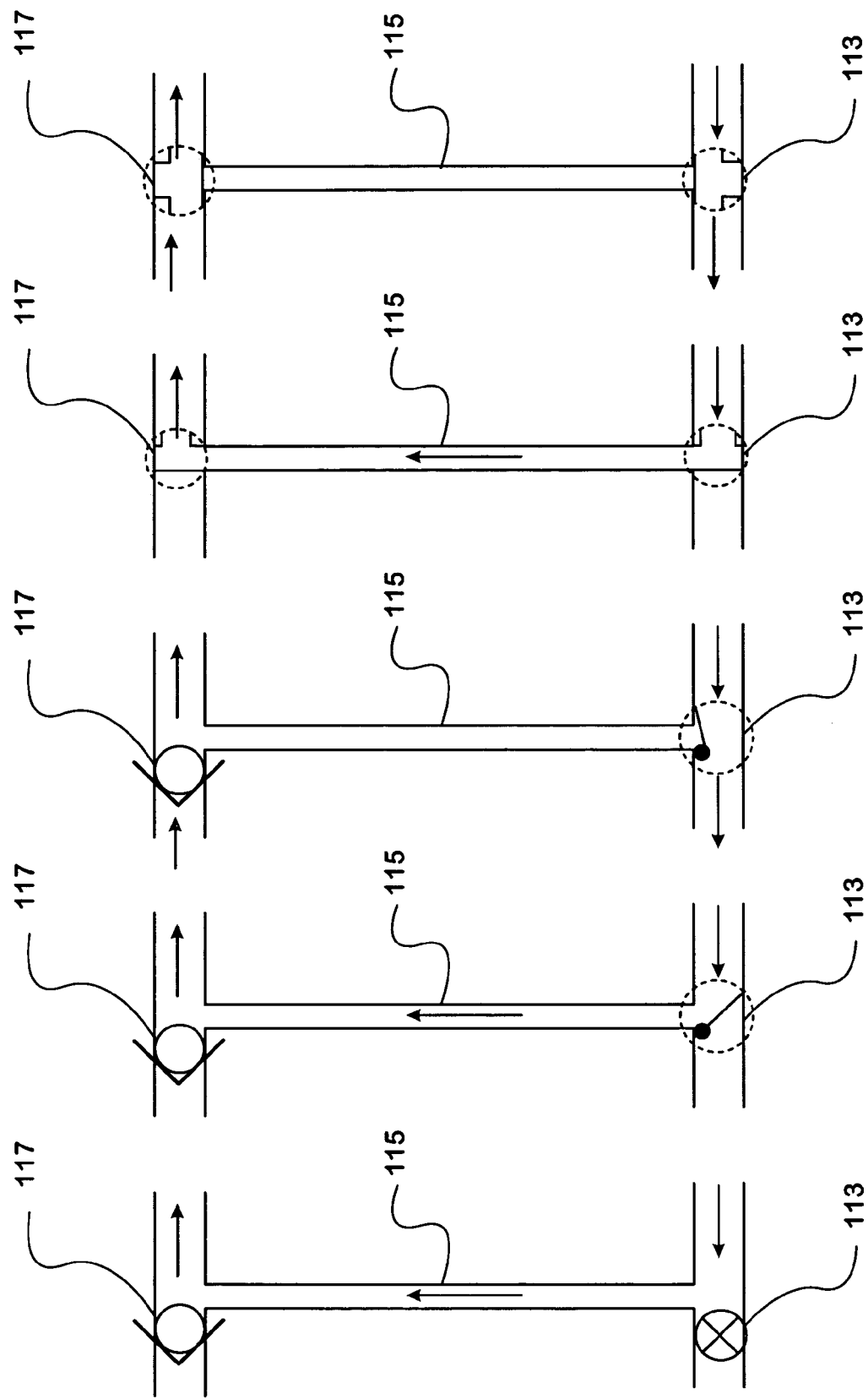

INTERCOOLER BYPASS

FIELD OF THE INVENTION

This invention relates to air flow systems for internal combustion engines, including but not limited to air flow systems utilizing intercoolers to provide air to cylinders of internal combustion engines.

BACKGROUND OF THE INVENTION

The use of turbochargers to provide compressed air for internal combustion engines is known. The turbocharger compresses the air, which is then cooled in an intercooler prior to being supplied to an air intake manifold for the cylinders of the engine. The intercooler provides a denser air stream to the engine, which stream is more efficiently combusted, thereby reducing emissions levels of the engine.

The path the air takes from the turbocharger through the intercooler and to the air intake manifold may be up to 10 feet or longer. As a result, there is lag time associated with the air stream traveling from the turbocharger to the cylinders. This lag is noticeable, for example, when changing from an idle state to vehicle launch, because of the distance the air must travel to reach the cylinders. The lack of immediate air supply results in poor acceleration that may including jerking and smoky emissions.

Accordingly, there is a need for a method and apparatus for eliminating or reducing lag time for internal combustion engines.

SUMMARY OF THE INVENTION

A method of bypassing an intercooler includes the steps of detecting an idle condition for an engine and, based on engine speed and load, inducing air to bypass an intercooler for the engine such that air is input to an intake manifold of the engine through an intercooler bypass that excludes the intercooler.

BRIEF DESCRIPTION OF THE DRAWINGS

FIG. 2 through FIG. 6 are diagrams showing various bypass valve types and locations with respect to the intercooler bypass in accordance with the invention.

DESCRIPTION OF A PREFERRED EMBODIMENT

The following describes an apparatus for and method of bypassing an intercooler for an internal combustion engine. When an idle state for an engine is detected, air is directed through an intercooler bypass to an intake manifold of the engine, while preventing flow from entering the intercooler. Smoother acceleration on vehicle launch and reduced emissions result.

Figure 1:
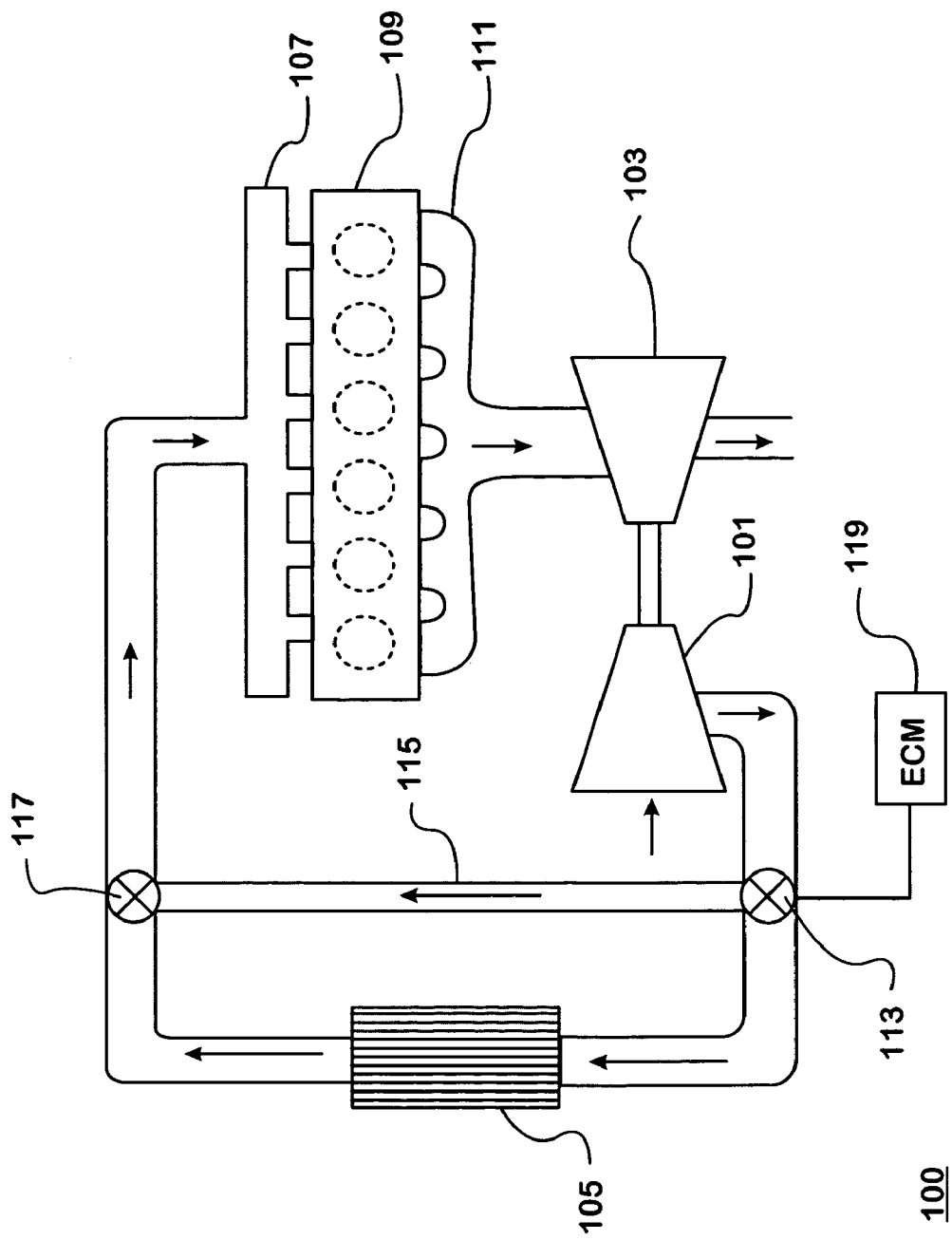
FIG. 1 is a diagram of an engine having an intercooler bypass in accordance with the invention.

A diagram of an engine 100 having an intercooler bypass is shown in FIG. 1. Air enters the air intake of a turbocharger through a compressor 101 that is connected via a shaft to a turbine 103. The turbocharger outputs compressed air via a discharge pipe into an intercooler 105. The intercooler 105 cools the air, which enters the air intake manifold 107 via an intake pipe. Air from the intake manifold 107 enters cylinders in an engine block 109 at a boost pressure. The cylinders output exhaust gas into an exhaust manifold 111, which gas enters the turbine 103 and an EGR system (not shown for the sake of simplicity).

A bypass valve 113 is disposed in the discharge pipe. An intercooler bypass 115 is disposed between the compressor 101 and the intake manifold 107 to provide a bypass path for air from the compressor 101 to the intake manifold 107. The length of the bypass 115 may be on the order of several inches, as compared to the path through the intercooler 105, which may be up to 10 feet or longer. Ideally, the bypass begins as close to the compressor 101 as possible and ends as close to the cylinders of the engine as is feasible. Although the bypass 115 is shown between the discharge pipe and the intake pipe, the bypass 115 may connect to the intake manifold instead of the intake pipe, which may be part of the intake manifold. The bypass valve 113 operates in two states. In the first state, the bypass valve 113 prevents airflow on the path to the intercooler 105 while directing airflow into the intercooler bypass 115. In the second state, the bypass valve 113 directs airflow to the intercooler 105 while preventing airflow into the intercooler bypass 115. Alternatively, in the second state, the bypass valve 113 may allow flow to travel through both the intercooler 105 and the intercooler bypass 115.

An optional backflow valve or a diaphragm 117 may be disposed in the intake pipe, at or near the intersection of the intercooler bypass 115 and the intake pipe. The backflow valve 117 may be utilized to prevent air from entering the intake pipe in a direction toward the intercooler 105, thus preventing air from entering the output of the intercooler 105. The backflow valve 117 directs air from the intercooler bypass 115 to the intake manifold 107 via the intake pipe.

An engine control module (ECM) 119 detects various engine conditions, as will be described later, and controls the bypass valve 113 and, if necessary, the backflow valve 117. The ECM 119 may be a conventional engine control module that is readily available in the industry. The bypass valve 113 is preferably hydraulically controlled by a signal from the ECM 119 that instructs the bypass valve 113 to operate in a particular position, e.g., open or closed, position 1 or position 2, and so forth. The backflow valve 117 may also be similarly operated, as appropriate. The same ECM 119 signal may be utilized to control both valves, although the signals sent to each valve 113 and 117 may be inverted with respect to the other. The valves may alternatively be pneumatically controlled.

The bypass and backflow valves 113 and 117 are disposed in the discharge pipe and intake pipe, respectively, although their locations need not be in the intersections where these pipes meet the intercooler bypass 115.

As shown in FIG. 2, the bypass valve 113 is disposed in the discharge pipe on the intercooler 105 side of the intercooler bypass 115. The bypass valve 113 in this location operates in an open position when flow to the intercooler 105 is desired and operates in a closed position when flow through the intercooler bypass 115 is desired, thereby preventing flow from entering the intercooler 105. The backflow valve 117 is disposed in the intake pipe on the intercooler 105 side of the intercooler bypass 115. In this embodiment, the backflow valve 117 is shown as a check valve that inhibits flow in a direction toward the intercooler 105 from the intercooler bypass 115. When the backflow valve 117 is a check valve, such as a reed valve or other type of mechanical check valve, external control, such as a signal from the ECM, is not required to open or close the valve.

FIG. 3 and FIG. 4 illustrate the use of a bypass valve 113 that pivots about a corner between two positions to provide flow direction. The bypass valve 113 is disposed in the intersection between the discharge pipe and the intercooler bypass 115. When the bypass valve 113 is in the position shown in FIG. 3, flow is directed from the compressor 101 into the intercooler bypass 115 and into the intake manifold, while preventing air from entering the intercooler 105. Air is prevented from entering the output of the intercooler 105 by the backflow valve 117, which is shown in this example as a check valve, as described with respect to FIG. 2. When the bypass valve 113 is in the position shown in FIG. 4, flow is directed from the compressor 101 to the intercooler 105, while preventing air from entering the intercooler bypass 115. The backflow valve 117, shown as a check valve, automatically allows flow from the intercooler 105 toward the intake manifold 107.

Figure 7:
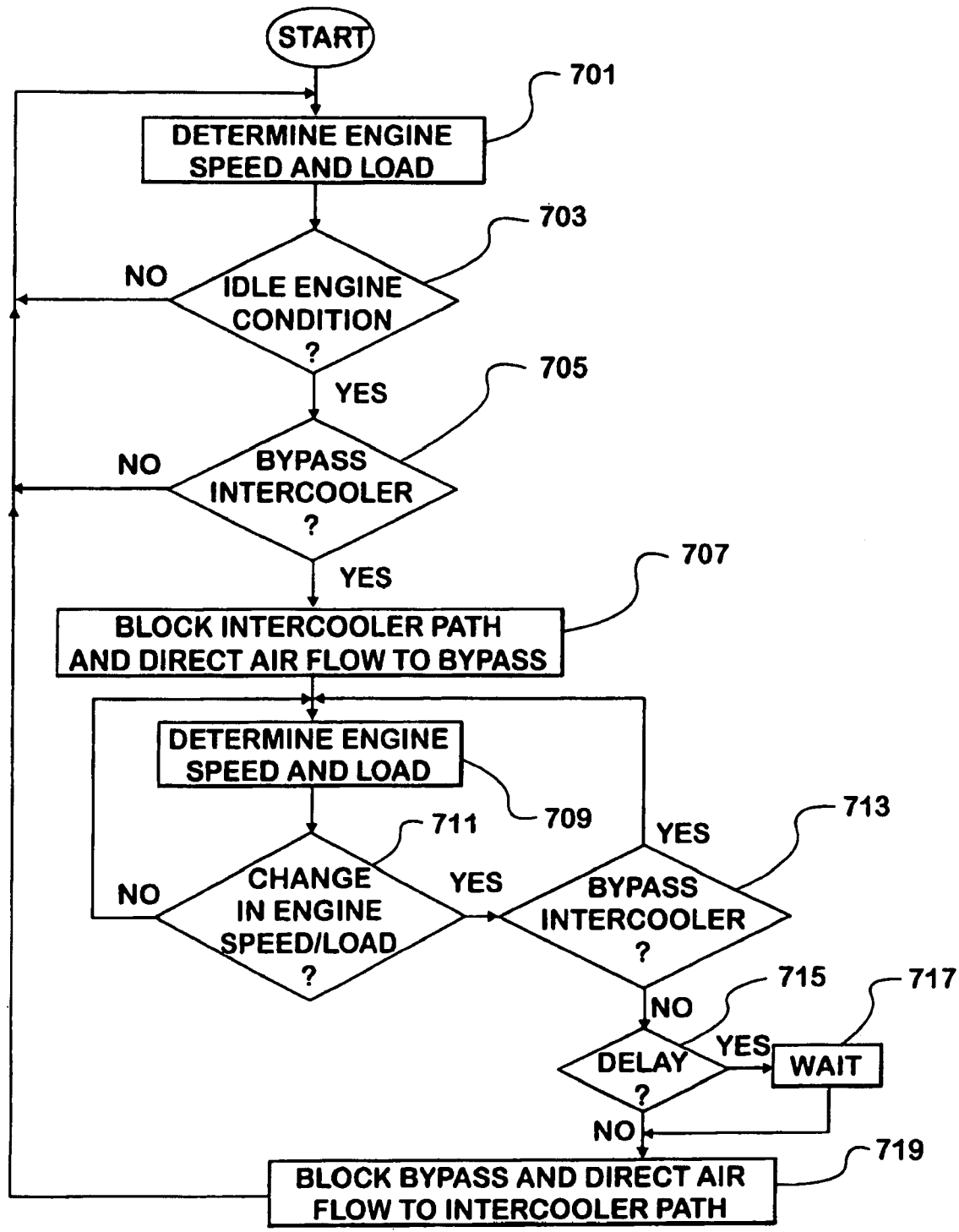
FIG. 7 is a flowchart showing a method of bypassing an intercooler in accordance with the invention.

FIG. 5 and FIG. 7 illustrate the use of a bypass valve 113 that rotates between two positions to provide flow direction. The bypass valve 113 is disposed in the intersection between the discharge pipe and the intercooler bypass 115. When the bypass valve 113 is in the position shown in FIG. 5, flow is directed from the compressor 101 into the intercooler bypass 115 and into the intake manifold, while preventing air from entering the intercooler 105. Air is prevented from entering the output of the intercooler 105 by the backflow valve 117, which is shown in this example as another rotating valve, similar to the bypass valve 113. When the bypass valve 113 is in the position shown in FIG. 6, flow is directed from the compressor 101 to the intercooler 105, while preventing air from entering the intercooler bypass 115. The backflow valve 117 directs flow from the intercooler 105 toward the intake manifold 107, while preventing flow from entering the intercooler bypass 115. In this embodiment, the bypass valve 113 and the backflow valve 117 may both be controlled by the same signal from the ECM 119.

FIG. 2 through FIG. 6 illustrate examples of valve types and valve locations. Other types of valves operating in different manners than described or shown herein, but providing the same results as described herein, may also be utilized. Examples of valves that may be utilized include exhaust brakes, such as the exhaust brakes available from US Gear Corporation, Pacbrake, or BD Engine Brake, Inc. For example, the backflow valve 117 maybe a pivoting valve similar to the bypass valve 113 shown in FIG. 3. Other valve locations may also be utilized as long as they provide the air flows as described herein. The use of the backflow valve 117 is optional.

A flowchart showing a method of bypassing an intercooler is shown in FIG. 7. The steps of the flowchart may be performed by the ECM 119. At step 701, engine speed and load are determined. Engine speed is a parameter that is accessible by the ECM 119 and is measured utilizing methods known in the art. Engine load may be determined by fuel demand amounts or requests that are received by the ECM 119. Other methods of determining load may also be utilized. If at step 703, based on the engine speed and load from step 701, the engine is determined to be in an idle state or condition, the process continues with step 705. If at step 703, based on the engine speed and load from step 701, the engine is determined not to be in an idle state or condition, the process continues with step 701. For example, when a fire truck is parked and the engine is running while water is pumped by the vehicle to fight the fire, the engine of the fire truck is not considered to be in an idle state. When a power take off gear is engaged and the engine load conditions are not considered to be in an idle state.

At step 705, it is determined whether or not it is desirable to bypass the intercooler. If at step 705, the intercooler is not to be bypassed, such as when the ambient temperature is hot, to meet an emissions requirement, or a default state, for example, when an electronics fault is detected, the process continues with step 701. If at step 705, the intercooler is to be bypassed, such as when the engine oil temperature, coolant temperature, ambient air temperature, or intake manifold temperature is cold or when the vehicle may imminently be launched, the process continues with step 707.

At step 707, airflow to the intercooler 105 is blocked and airflow is directed into the intercooler bypass 115. Step 707 may be performed by the ECM 119, which induces air to bypass the intercooler 105 by sending a control signal to the bypass valve 113. The control signal instructs the valve 113 to operate in a position that prevents air from entering the intercooler 105 while directing air into the intercooler bypass 115. If a backflow valve 117 is also utilized and requires a signal to provide the correct flow, the control signal from the ECM 119 may be utilized to control the backflow valve 117.

The process continues with step 709, where engine speed and load are determined, for example, utilizing the method from step 701. If at step 711 there is a change in engine speed and/or load, the process continues with step 713. If at step 713 it is still desirable to bypass the intercooler 105, such as when the change in engine speed and/or load does not warrant disengaging the bypass, e.g., high engine speed or low engine load, the process continues with step 709. If at step 713 it is no longer desirable to bypass the intercooler 105, such as when vehicle launch is detected via a change in engine load from the ECM 119, the process continues with step 715.

At step 715, it is determined whether or not to delay disengaging the use of the intercooler bypass 115. For example, during vehicle launch, it is advantageous to leave the bypass 115 engaged until the engine is accelerated and sufficient compressor boost is achieved. If a delay is not desired, the process continues with step 719. If a delay is desired, the process continues with step 717, where the process waits until a specific engine condition is met, e.g., sufficient compressor boost, or until a fixed amount of time passes, and once the condition is met or the time passes, the process continues with step 719. During the waiting step 717, the bypass valve 113 may be gradually opened to allow air to gradually enter the intercooler 105 while air is directed through the bypass 115.

At step 719, airflow is directed to the intercooler 105 and airflow is optionally blocked from entering the intercooler bypass 115. Flow to the bypass 115 may be blocked partially, completely, or not at all. Step 719 may be performed by the ECM 119, which disengages use of the bypass 115 by sending a control signal to the bypass valve 113. The control signal instructs the valve 113 to operate in a position that directs air into the intercooler 105 while, optionally, preventing air from entering the intercooler bypass 115. If a backflow valve 117 is also utilized and requires a signal to provide the correct flow, the control signal from the ECM 119 may be utilized to control the backflow valve 117.

The drawings of FIG. 1 and FIG. 2 show various geometries, shapes, widths, and lengths, that are not necessarily indicative of the actual geometries, shapes, widths, and lengths of the pipes and other elements, but are drawn as such for simplicity of the drawing and to illustrate the fluid flow communication between and through the elements. For example, the air intake pipe may be part of the intake manifold 107.

Although the present invention is illustrated by the example of a six-cylinder engine having a turbocharger, the present invention may be applied to: engines having two or more cylinders, including those with less than or greater than six cylinders; various engine types, such as I-6, V-6, V-8, and so forth; diesel engines, gasoline engines, or other types of engines; turbocharged engines; and engines of any size.

The present invention increases the amount of compressed air at the time of vehicle launch to obtain optimum acceleration, resulting in reduced smoke and emissions levels. Excessive smoke during a vehicle launch is often caused by insufficient fresh air being delivered to the cylinders to react with the fuel. Warmer air entering the intake manifold helps an engine warm up faster, especially in cold conditions, and prevents white smoke and engine misfire for cold engines. The method is be performed independent of air temperature and/or air pressure in the intake manifold. Prior methods that bypass the intercooler do so typically only in colder temperatures and only during engine warm-up; once the engine is warmed up, the bypass is not utilized. Bypassing the intercooler during idle states, particularly prior to vehicle launch, provides for smoother acceleration and a more responsive engine with lower emissions levels.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising the steps of:
   detecting an idle condition for an engine; and
   based on engine speed and load, inducing air to bypass an intercooler for the engine and preventing air from entering the intercooler such that air is input to an intake manifold of the engine through an intercooler bypass that excludes the intercooler.

2. The method of claim 1, wherein the step of inducing comprises sending a control signal to a valve, and wherein the control signal instructs the valve to operate in a position that blocks air from entering the intercooler while directing air into the intercooler bypass.

3. The method of claim 1, further comprising the step of disengaging use of the intercooler bypass and directing air through the intercooler to provide air to the intake manifold.

4. The method of claim 3, wherein the step of disengaging is performed by gradually changing a position of the valve.

5. The method of claim 3, wherein the step of disengaging comprises sending a control signal to a valve, and wherein the control signal instructs the valve to operate in a position that blocks air from entering the intercooler bypass while directing air into the intercooler.

6. The method of claim 1, further comprising the step of preventing flow from the intercooler bypass from entering an outlet of the intercooler.

7. The method of claim 1, wherein the steps of detecting and inducing are performed by an engine control module.

8. The method of claim 1, wherein the step of inducing is performed independent of ambient air temperature.

9. The method of claim 1, wherein the step of inducing is performed utilizing hydraulic control of at least one valve.

10. The method of claim 1, further comprising the step of sending a control signal to a valve, and wherein the control signal instructs the valve to operate in a position that prevents air from entering an output of the intercooler while directing air from the intercooler bypass to the intake manifold.

11. The method of claim 1, wherein the step of inducing improves vehicle launch.

12. A method comprising the steps of:
    detecting an idle condition for an engine;
    based on engine speed and load, inducing air to bypass an intercooler for the engine such that air is input to an intake manifold of the engine through an intercooler bypass that prevents air from entering the intercooler; and
    detecting that the engine is no longer in an idle condition, and after a delay, disengaging use of the intercooler bypass and reengaging use of the intercooler to provide air to the intake manifold.

13. The method of claim 12, wherein the step of disengaging comprises sending a control signal to a valve, and wherein the control signal instructs the valve to operate in a position that blocks air from entering the intercooler bypass while directing air into the intercooler.

14. A method comprising the steps of:
    detecting an idle condition for an engine; and
    based on engine speed and load, inducing, independent of air pressure in the intake manifold, air to bypass an intercooler for the engine and preventing air from entering the intercooler such that air is input to an intake manifold of the engine through an intercooler bypass that excludes the intercooler.

15. A method comprising the steps of:
    detecting an idle condition for an engine;
    determining engine speed and load for the engine; and
    when the engine is in idle condition, inducing air to bypass an intercooler for the engine and preventing air from entering the intercooler such that air is input to an intake manifold of the engine through an intercooler bypass.

16. The method of claim 15, wherein the step of inducing is performed independent of ambient air temperature.

17. A method comprising the steps of:
    detecting an idle condition for an engine;
    when the engine is in idle condition, inducing air to bypass an intercooler for the engine such that air is input to an intake manifold of the engine through an intercooler bypass;
    detecting that the engine is no longer in an idle condition, and after a delay, disengaging use of the intercooler bypass and reengaging use of the intercooler to provide air to the intake manifold based on engine speed and load, thereby improving vehicle launch.

18. A method comprising the steps of:
    detecting an idle condition for an engine;
    when the engine is in idle condition, inducing air to bypass an intercooler for the engine and preventing air from entering the intercooler such that air is input to an intake manifold of the engine through an intercooler bypass;
    detecting that the engine is no longer in an idle condition, and after sufficient compressor boost is achieved, disengaging use of the intercooler bypass and reengaging use of the intercooler to provide air to the intake manifold.

19. An apparatus comprising:
an intercooler disposed between a discharge pipe and an intake manifold;
an intercooler bypass disposed between the discharge pipe and the intake manifold and excluding the intercooler; and
a bypass valve disposed in the discharge pipe such that when the bypass valve operates in a first position, airflow from the discharge pipe is directed into the inter-cooler and when the bypass valve operates in a second position, airflow from the discharge pipe is directed into the inter-cooler bypass and airflow into the intercooler is prevented;
wherein the bypass valve is controllable by an engine control module that instructs the bypass valve to operate based on engine speed and load and independent of temperature for an engine in an idle condition.

20. An apparatus comprising:
an intercooler disposed between a discharge pipe and an intake manifold;
an intercooler bypass disposed between the discharge pipe and the intake manifold and excluding the intercooler; and
a bypass valve disposed in the discharge pipe such that when the bypass valve operates in a first position, airflow from the discharge pipe is directed into the intercooler and when the bypass valve operates in a second position, airflow from the discharge pipe is directed into the intercooler bypass and airflow into the intercooler is prevented;
a backflow valve arranged and constructed to prevent airflow into the intercooler when the bypass valve operates in a second position;
wherein the bypass valve is controllable by an engine control module that instructs the bypass valve to operate based on engine speed and load for an engine in an idle condition.

21. The apparatus of claim 20, wherein the backflow valve is disposed near an intersection of the intercooler bypass and the intake manifold.

22. The apparatus of claim 20, wherein the bypass valve is disposed in or near an intersection of the discharge pipe and the intercooler bypass.

23. The apparatus of claim 20, wherein the bypass valve is hydraulically controlled by the engine control module.

24. The apparatus of claim 20, wherein the bypass valve is controllable by an engine control module that instructs the bypass valve to operate based on engine speed and load and independent of engine temperature.

25. An internal combustion engine comprising the apparatus of claim 20.

* * * * *